March 19, 1929.  A. J. ALWILL  1,706,206
ARBOR
Filed May 9, 1928
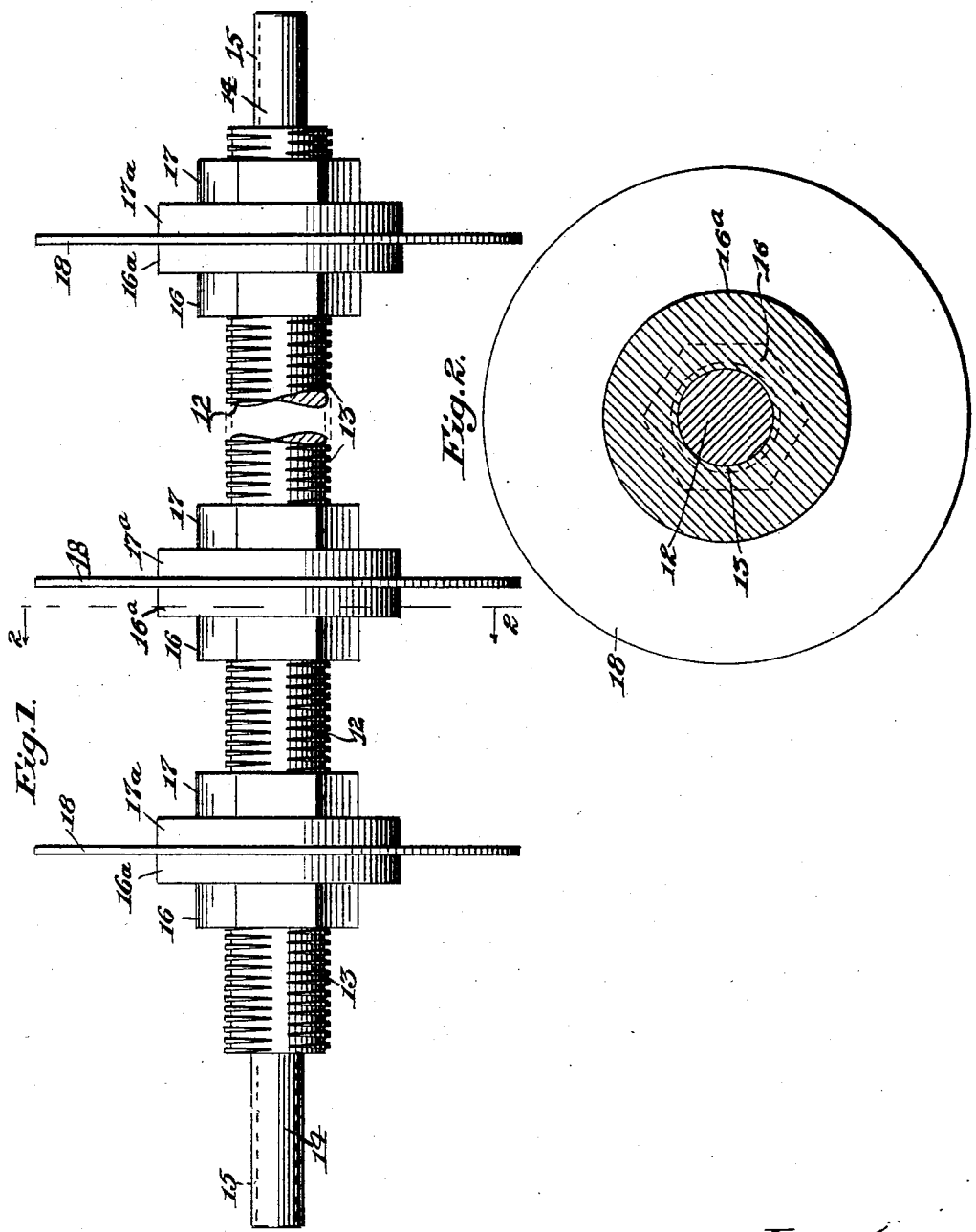

Patented Mar. 19, 1929.

1,706,206

UNITED STATES PATENT OFFICE.

ARTHUR J. ALWILL, OF RUTLAND, VERMONT, ASSIGNOR TO VERMONT MARBLE COMPANY, A CORPORATION OF VERMONT.

ARBOR.

Application filed May 9, 1928. Serial No. 276,486.

This invention relates to an improved arbor more especially designed for use on stone cutting or carborundum coping and molding machines, and the invention has for its object to provide convenient means for adjustably mounting the cutting saws or wheels on the arbor in such a manner that they may be quickly and conveniently adjusted to vary the space between them, while in use the cutting saws or wheels will be securely clamped in place. To this end the arbor is provided with a right and left hand screw threaded portion for the reception of a plurality of right and left hand nuts between which the cutting saws or wheels are clamped, said nuts preferably comprising integral flange portions which abut against the cutting saws or wheels.

In the accompanying drawing Fig. 1 is a broken out elevation of the improved arbor. Fig. 2 is a section on line 2—2 of Fig. 1.

Referring to the drawing, 12 denotes the arbor which is constructed with right and left hand screw portion 13 and with plain end portions 14, one or both of which end portions may be provided with one or more grooves 15 for the attachment of a driving wheel or wheels, by means of a spline or splines. Mounted on the screw threaded portion 13 of the arbor are right and left hand nuts 16 and 17 having flanged portions 16$^a$ and 17$^a$ between which are mounted the cutting saws or disks 18.

From the foregoing it will be understood that the spaces between the cutting saws or wheels may be easily and quickly varied, when desired, simply by the adjustment of the nuts 16 and 17 on the right and left hand screw threaded portion of the arbor, while the cutting wheels or saws, which may be of carborundum or any other desired material, will be securely held in working position when the nuts are tightened against them.

In the use of the improved arbor it will be rotated in a direction which will tend to tighten the nuts in their clamping positions against the cutting saws or wheels.

Having thus described my invention I claim and desire to secure by Letters Patent:

1. An arbor, for use in mounting a plurality of spaced cutting saws or wheels, constructed with right and left hand screw threads throughout the portion thereof to be occupied by said saws or wheels, combined with right and left hand threaded nuts opposing each other and between which the said saws or wheels are to be located.

2. An arbor, for use in mounting a plurality of spaced cutting saws or wheels, constructed with right and left hand screw threads throughout the portion thereof to be occupied by said saws or wheels, combined with right and left hand threaded nuts opposing each other and between which the said saws or wheels are to be located, said nuts having integral flanges to bear against said saws or wheels.

In testimony whereof I affix my signature.

ARTHUR J. ALWILL.